US006768853B2

(12) United States Patent
Neveux, Jr.

(10) Patent No.: US 6,768,853 B2
(45) Date of Patent: Jul. 27, 2004

(54) BUFFERED OPTICAL FIBERS AND METHODS OF MAKING SAME

(75) Inventor: Paul E. Neveux, Jr., Loganville, GA (US)

(73) Assignee: Fitel USA Corp., Norcross, GA (US)

( * ) Notice: Subject to any disclaimer, the term of this patent is extended or adjusted under 35 U.S.C. 154(b) by 140 days.

(21) Appl. No.: 10/176,844

(22) Filed: Jun. 21, 2002

(65) Prior Publication Data

US 2003/0235382 A1 Dec. 25, 2003

(51) Int. Cl.[7] .................................................. G02B 6/02
(52) U.S. Cl. ....................... 385/128; 385/126; 385/127
(58) Field of Search .......................... 385/105, 109–113, 385/122–128, 141–145

(56) References Cited

U.S. PATENT DOCUMENTS

| | | | |
|---|---|---|---|
| 4,929,051 A | 5/1990 | Rogler et al. | 350/96.3 |
| 5,011,260 A | 4/1991 | Marx et al. | 350/96.23 |
| 5,062,685 A * | 11/1991 | Cain et al. | 385/114 |
| 5,684,910 A | 11/1997 | Chapin et al. | 385/128 |
| 5,917,978 A * | 6/1999 | Rutterman | 385/109 |
| 6,208,790 B1 * | 3/2001 | Zopf et al. | 385/128 |
| 6,298,188 B1 | 10/2001 | Chapin et al. | 385/123 |

FOREIGN PATENT DOCUMENTS

| | | | |
|---|---|---|---|
| EP | 169592 | 1/1986 | C03C/25/02 |
| EP | 0260756 | 3/1988 | C03C/25/02 |
| EP | 0293886 | 12/1988 | G02B/6/44 |
| EP | 0484687 | 5/1992 | G02B/6/44 |
| EP | 0527266 | 2/1993 | G02B/6/44 |

* cited by examiner

Primary Examiner—Phan T. H. Palmer
(74) Attorney, Agent, or Firm—Thomas, Kayden, Horstemeyer & Risley, LLP

(57) ABSTRACT

Buffered optical fibers and methods of fabricating them are presented. A representative buffered optical fiber includes an optical fiber through which optical signals can be transmitted and an inner layer comprising an ultra-violet (UV) curable acrylate material that surrounds the optical fiber and protects the core of the optical fiber from microbending forces.

10 Claims, 2 Drawing Sheets

BUFFERED OPTICAL FIBERS AND METHODS OF MAKING SAME

TECHNICAL FIELD OF THE INVENTION

The present invention is generally related to optical fiber layers and, more particularly, to one or more optical fiber layers that buffer the optical fiber and enhance microbend resistance and low-temperature performance of the optical fiber.

BACKGROUND OF THE INVENTION

Optical fibers are now in widespread use as communication media. Conventional optical fibers typically include a glassy core and one or more coating layers surrounding the core. Surrounding the coating layers is at least one further layer of material, commonly referred to as a buffer or outer layer, which protects the fiber from damage and which provides the appropriate amount of stiffness to the fiber. The outer layer usually is mechanically stripped away from the fiber when the fiber is connected to an optical fiber connector. Normally, the outer layer is composed of a thermoplastic polymeric material, which is extruded directly over the coated optical fiber. Common materials used to form outer layers include polyvinyl chloride (PVC), nylon, and polyesters, fluropolymers, etc.

In many cases, it is necessary that the thermoplastic outer layer be removable without disturbing the optical fiber coatings. This is facilitated by the use of an inner layer, which allows the removal of the outer buffer material without removing the coating. The inner layer also facilitates better temperature performance at low temperatures by serving as a compliant layer between the hard thermoplastic buffer material and the optical fiber.

Conventional dual-layered tight buffered optical fibers have an inner layer made of polyethylene/ethylene-ethyl acrylate (PE/EEA) copolymer. However, this material has several disadvantages (U.S. Pat. No. 5,684,910). One disadvantage of using PE/EEA is that, being a thermoplastic, the viscosity of the PE/EEA copolymer decreases when the outer layer is applied thereby causing the PE/EEA copolymer to become much less viscous and more fluid-like. The impact of this is that any volatilization coming from the optical fiber coating, whether it is moisture or low molecular weight components, may cause the formation of bubbles in the inner layer. Bubbles, depending on size and frequency, will cause attenuation to increase in the optical fiber, which is typically seen at low temperatures (e.g., −20° C.). If the bubbles are severe, an increase in attenuation may occur at room temperature (~21° C.).

An additional problem caused by the material is that the attenuation of the optical fiber cable increases at temperatures below −20° C. The increased attenuation at temperatures below −20° C. can be attributed to the increase in the elastic modulus of the EEA. Therefore, EEA does not satisfy the need for inner layers having minimal variation in elastic modulus over the temperature range of −40° C. to 80° C.

The critical nature of the inner layer becomes even more apparent when applied to newer, higher bandwidth fibers (e.g., 50 micron multi-mode fibers with reduced differential modal dispersion). These fibers and others have higher bandwidths but generally are more microbend sensitive.

Thus, a heretofore unaddressed need exists in the industry to address the aforementioned deficiencies and inadequacies.

SUMMARY OF THE INVENTION

Briefly described, embodiments of the present invention provide for buffered optical fibers and methods for fabricating them. A representative buffered optical fiber in accordance with the present invention includes an optical fiber through which optical signals can be transmitted and a layer comprising an ultra-violet (UV) curable acrylate material that surrounds the optical fiber and protects the core of the optical fiber from microbending forces.

A representative method for fabricating the buffered optical fiber includes: advancing a fiber core through a coating head oriented in a vertical position; the coating head placing an inner layer on the optical fiber, the inner layer being an ultra-violet (UV) curable acrylate material; advancing the optical fiber having the inner layer thereon through a UV oven oriented in a vertical position, the UV oven curing the UV curable acrylate material; and advancing the optical fiber having the cured inner layer thereon into a horizontal processing system using a transition sheave.

Other features and advantages of the present invention will become apparent to one skilled in the art upon examination of the following drawings and detailed description.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Broadly speaking, embodiments of the present invention are directed to buffered (e.g., tight or semi-tight) optical fibers, which can then be made into cables or cordage, having increased microbend resistance and improved low-temperature performance. The buffered optical fiber can be a single-fiber buffered optical fiber, a multiple-fiber buffered optical fiber bundle or array, or a buffered ribbon, for example.

The buffered optical fibers of the present invention can include, for example, an inner layer and at least one coating layer constructed of an ultra-violet (UV) curable acrylate material whose modulus and thickness can be varied to optimize performance.

Constructing the inner layer and/or the coating layer of UV curable acrylate material enables the optical fiber cable to have increased microbend resistance, which enables the optical fiber to resist the lateral forces encountered during the manufacture of the optical fiber cable or cordage (interconnect cable) without increasing attenuation of the optical fiber(s) in the cable. The resultant cable or cordage is also better able to resist lateral forces encountered during the installation of the cable in the service environment, thereby avoiding increases in attenuation. In addition, the resultant cable and/or cordage has better performance at low temperatures, which, because of the thermal expansion coefficient of the materials making up the cable and/or cordage, cause the cable and/or cordage to contract and induce microbending in the buffered fiber.

UV curable acrylates are cured (i.e., cross-linked) materials that do not flow substantially during the extrusion process in the way that thermoplastics do, which are used as inner layer materials in conventional arrangements. Thus, using cured materials enables the formation of bubbles in the inner layer to be avoided. In addition, the UV curable acrylates exhibit minimal variation in elastic modulus over the temperature range of about −40° C. to about 85° C. This allows the inner layer to remain compliant over a much broader temperature range, and thereby prevents attenuation loss at low temperatures.

Now, having described optical fibers of the present invention in general, FIGS. 1 through 5 will be described in order to demonstrate some potential embodiments of optical buffered fibers of the present invention and the associated methods of fabrication thereof. While embodiments of buffered optical fibers are described in connection with FIGS. 1 through 5 and the corresponding text, there is no intent to limit embodiments of the optical fibers to these descriptions. To the contrary, the intent is to cover all alternatives, modifications, and equivalents included within the spirit and scope of the present invention.

Figure 1:
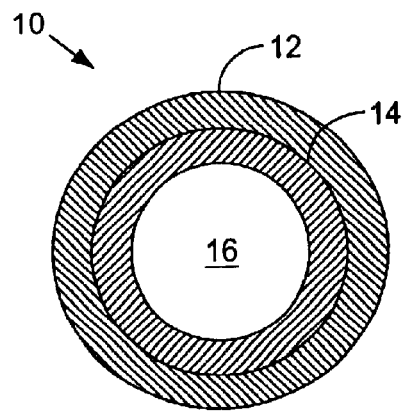
FIG. 1 illustrates a representative buffered optical fiber having an inner layer made of an ultra-violet (UV) curable acrylate material and an outer thermoplastic buffer material.

With reference to the figures, FIG. 1 illustrates a buffered optical fiber 10 having an outer or buffer layer 12, an inner layer 14, and an optical fiber 16. The optical fiber 16 may include a glassy core and one or more coating layers surrounding the core (not depicted). In the embodiment illustrated in FIG. 1, the coating layers surrounding the glassy core can be made of materials known in the art.

The inner layer 14 can be made from an UV curable acrylate material. Preferably, the inner layer 14 is made of UV curable acrylate materials such as, for example, UV curable urethane acrylate, a UV curable silicon acrylate, and/or a UV curable siloxane acrylate material.

When the inner layer 14 is made of UV curable acrylate materials, the microbend resistance and low-temperature performance of the buffered optical fiber 10 will be improved. Increased microbend resistance allows the buffered optical fiber 10 to resist lateral forces encountered during cable manufacture and installation such that minimal optical loss occurs. Improved low-temperature performance of the buffered optical fiber 10 allows an optical fiber cable made up of one or more buffered optical fibers 10 to be constructed such that minimal optical loss occurs.

In addition, the inner layer 14 comprised of the UV-curable acrylate material can have one or more of the following characteristics. First, the inner layer 14 can have a glass transition temperature less than about −10° C. Buffered optical fibers 10 having inner layers 14 with low glass transition temperatures have increased optical performance at low temperatures. Second, the inner layer 14 can have a secant tensile modulus at 2.5% elongation (tensile modulus modulus at 2.5%) of about 0.5 megapascals to about 10 megapascals, about 0.8 megapascals to about 2.5 megapascals, or preferably, about 0.9 megapascals to about 1.7 megapascals. Buffered optical fibers 10 having an inner layer 14 with low tensile modulus have increased low-temperature optical performance and increased microbend resistance, and the strip force is kept within an acceptable range.

Third, the inner layer 14 has a gel fraction of greater than about 70%, about 70% to about 95%, or preferably, about 85% to about 95%. Decreased outgassing during processing can be achieved by fabricating optical fiber cables 10 having inner layers 14 with high gel fractions, thereby decreasing interfacial voids.

Fourth, the inner layer 14 has a viscosity of about 2,000 to about 10,000 megapascals per second, or preferably, about 3,300 to about 6,200 megapascals per second. Increased processing line speed can be achieved for optical fiber cables 10 having inner layers 14 with low viscosities. In addition, buffered optical fibers 10 having low viscosity inner layers 14 coat the optical fiber in a uniform manner.

The inner layer 14 can have a thickness of about 10 μm to about 200 μm, about 20 μm to about 125 μm, or preferably, about 35 μm to about 95 μm.

The outer layer 12 can be a high-modulus material such as, for example, polyvinyl chloride (PVC), polyamide (nylon), polypropylene, polyesters (e.g., PBT), and fluoropolymers (e.g., PVDF or FEP). In addition, the outer layer 12 may include one or more layers. Preferably, the outer layer 12 has a thickness of about 200 μm to about 350 μm.

Figure 2:
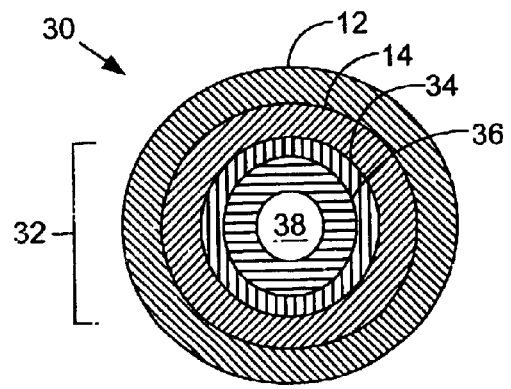
FIG. 2 illustrates a representative buffered optical fiber having an optical fiber glass core, a primary layer, a secondary layer or coating, an inner layer made of the UV curable acrylate material, and a thermoplastic outer buffer coating or layer.
Figure 3:
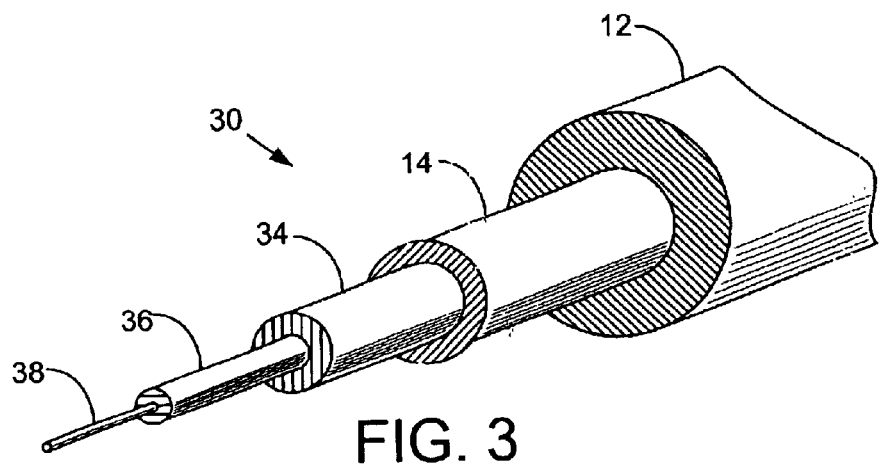
FIG. 3 illustrates a perspective view of the optical fiber cable shown in FIG. 2.

FIG. 2 illustrates a cross sectional view of a buffered optical fiber 30, and FIG. 3 illustrates a perspective view of the buffered optical fiber 30. In accordance with this embodiment, the buffered optical fiber 30 includes an outer layer 12, an inner layer 14, an optical fiber 32, a primary layer coating 36, and a secondary layer 34. The primary layer coating 36 surrounds the fiber core 38 and the secondary layer 34 surrounds the primary layer. The fiber core 38 is a conduit for transmitting energy (e.g., light) and can be made of materials such as glass or plastic.

The primary layer coating 36 can include an UV-curable acrylate material. Preferably, the primary layer coating 36 is made of UV-curable acrylate materials such as, for example, a UV curable urethane acrylate, a UV curable silicon acrylate, and/or a UV curable siloxane acrylate material. When the primary layer coating 36 is made of UV-curable acrylate materials, the microbend resistance of the buffered optical fiber 30 is increased. As stated above, increased microbend resistance allows the buffered optical fiber 30 to resist lateral forces encountered during cable manufacture and installation such that minimal optical loss is detected.

In addition, the primary layer coating 36 can have one or more of the following characteristics. First, the primary layer coating 36 can have a glass transition temperature less than −10° C. Optical fiber cables 30 having a primary layer coating 36 with low glass transition temperatures have increased optical performance at low temperatures.

Second, the primary layer coating 36 can have a 2.5% secant tensile modulus (tensile modulus at 2.5% elongation) of about 0.5 megapascals to about 10 megapascals, about 0.8 megapascals to about 2.5 megapascals, or preferably, about 0.9 megapascals to about 1.7 megapascals. Buffered optical fibers 30 having a primary layer coating 36 with low tensile modulus increases the low-temperature optical performance and increases the microbend resistance, while keeping the strip force in an acceptable range.

Third, the primary layer coating 36 has a gel fraction of greater than about 85%, about 85% to about 95%, or preferably, about 90% to about 95%. Decreased outgassing during processing can be achieved by fabricating buffered optical fibers 30 having primary layer coating 36 with high gel fractions, thereby decreasing interfacial voids.

Fourth, the primary layer coating 36 has a viscosity of about 2,000 to about 10,000 megapascals per second, or preferably, about 3,300 to about 6,200 megapascals per second. Increased processing line speed can be achieved for optical fibers 32 having respective primary layers 36 with low viscosities. In addition, low viscosity inner layers 14 coat the optical fiber 32 in a uniform manner.

The primary layer coating 36 can have a thickness of about of about 20 μm to about 50 μm, and preferably a thickness of about 35 μm to about 45 μm.

The secondary layer 34 can be fabricated from materials such as a UV curable urethane acrylate, a UV curable silicon acrylate, and/or a UV curable siloxane acrylate material, for example. The thickness of the secondary layer 34 can range from about 10 μm to about 40 μm, and the thickness can be adjusted to yield an optical fiber 32 having with an outer diameter of, for example, about 250 μm. The thickness of the primary layer coating 36 and of the secondary layer 34 can be adjusted to achieve an appropriate or desired microbend resistance and low-temperature performance. For example, if the primary layer coating 36 and the secondary layer 34 each have a thickness of about 40 μm and 22 μm, respectively, improved microbend resistance and low-temperature performance will be achieved.

The inner layer 14 and the outer buffer layer 12 have been described above with reference to FIG. 1. Therefore, no further discussion about these two layers will be provided herein. It should be noted that buffered optical fiber 30 having the primary layer coating 36 and the inner layer 14 fabricated from UV-curable acrylate materials can achieve appropriate microbend resistances. The resultant cable or cordage is also better able to resist lateral forces encountered during the installation of the cable in the service environment, thereby preventing increases in attenuation. In addition, the resultant cable and/or cordage is better able to perform at low temperatures. As stated above, because of the thermal expansion coefficient of the materials making up the cable and/or cordage can cause the cable and/or cordage to contract and induce microbending in the buffered fiber. This is avoided by using the aforementioned materials in accordance with the present invention.

Figure 4:
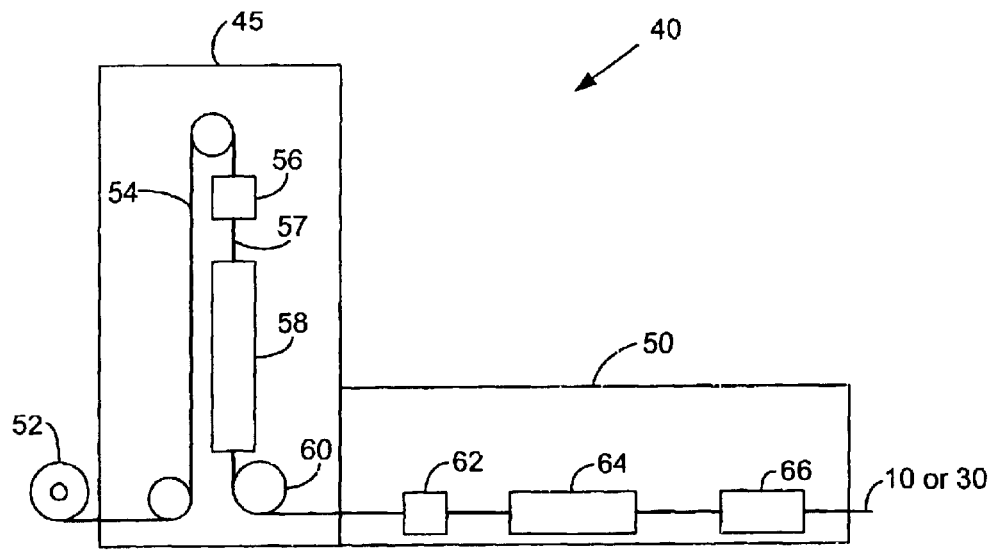
FIG. 4 illustrates a schematic diagram of the process for fabricating the optical fibers shown in FIGS. 1 and 2.

FIG. 4 illustrates a schematic diagram of a representative apparatus 40 for fabricating the buffered optical fiber 10 and/or the buffered optical fiber 30 of the present invention. The apparatus 40 includes a vertical processing system 45 and a horizontal processing system 50. The fiber core 16 and/or fiber core 38 (hereinafter fiber 54) is located on a spool 52. The fiber 54 is advanced through a coating head 56 oriented in a vertical position which places the inner layer on the fiber 57.

After the inner layer is placed on the fiber 54, the coated fiber 57 is advanced through ultra-violet ovens 58, which cure the inner layer. The orientation of the coating head 56 in the vertical position allows for geometric control of the layer and greater line speeds than if the coating head 56 were in the horizontally oriented. However, it should be noted that the optical fiber cables 10 and 30 can be fabricated while having the coating head 56 and/or the ultra-violet ovens 58 oriented in the horizontal position.

Thereafter, a transition sheave 60 directs the cured inner-layer-coated fiber 57 into the horizontal processing system 50. The cured inner-layer-coated fiber 57 is advanced through a cross-head extruder 62, which places a thermoplastic material on the inner-layer-coated fiber. Water troughs 64, cool and harden the thermoplastic coating. The fiber is then taken up on a take-up roll 66.

Figure 5:
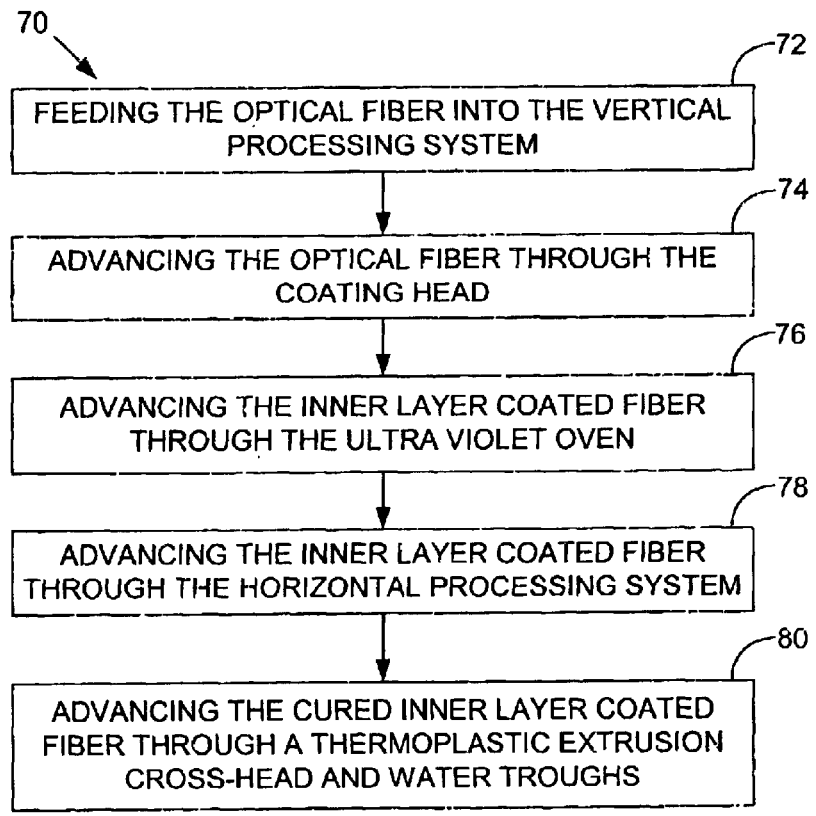
FIG. 5 illustrates a flow diagram of a representative method for fabricating the buffered optical fiber shown in FIGS. 1 and 2.

FIG. 5 illustrates a representative flow diagram of the process 70 of fabricating buffered optical fiber 10 and/or buffered optical fiber 30. Initially, the optical fiber 54 is fed into the vertical processing system 45, as shown in block 72. Then, the optical fiber 54 is advanced through the coating head 56 that is vertically oriented, where the inner layer is coated onto the optical fiber, thereby forming the inner-layer-coated fiber 57, as shown in block 74. Subsequently, the inner-layer-coated fiber 57 is advanced through the ultra-violet ovens 58 to cure the layer, as shown in block 76.

Next, the cured inner-layer-coated fiber 57 is advanced through the horizontal processing system 50, as shown in block 78. The cured inner-layer-coated fiber 57 is then advanced into a thermoplastic extrusion cross-head 62, which coats the fiber with a thermoplastic material, and then through the water troughs 64, which cool and harden the thermoplastic material as shown in block 80. Thereafter, the buffered optical fiber 10 and/or 30 is taken up on a take-up roll 66.

It should be emphasized that the above-described embodiments of the present invention, particularly, any "preferred" embodiments, are merely examples of implementations of the present invention, and are set forth herein to provide a clear understanding of the principles of the present invention. Many variations and modifications may be made to the above-described embodiments of the present invention without departing from the scope and principles of the invention. For example, the inner layer coating step discussed above could be accomplished in a horizontal orientation and the buffer extrusion step could be accomplished in a vertical orientation. All such modifications and variations are within the scope of this disclosure and the present invention.

What is claimed is:

1. A buffered optical fiber comprising:
   an optical fiber through which optical signals can be transmitted, the optical fiber having a core and cladding comprising a glass fiber, a first layer surrounding and in contact with said fiber, said first layer comprising a UV curable acrvlate material;
   a second layer surrounding and in contact with said first layer;
   a third layer surrounding and in contact with said second layer wherein said third layer is an ultra-violet (UV) curable acrylate material having a first modulus for protecting the optical fiber from microbending forces and enbancing low temperature performance; and
   a fourth layer surrounding and in contact with said third layer, the material of said fourth layer having a modulus greater than the modulus of said third layer, said material being a thermoplastic and selected from one or more of the groups including polyamides, polypropylenes, polyesters and/or fluropolymers;
   wherein the combination for layers protects against increases in attenuation at low temperatures and micobendmg losses.

2. A buffered optical fiber as claimed in claim 1 wherein the material of said fourth layer is a nylon polyamide.

3. A buffered optical fiber as claimed in claim 1 wherein the material of said fourth layer is a PBT polyester.

4. A buffered optical fiber as claimed in claim 1 wherein the material of said fourth layer is a PVDF fluoropolymer.

5. A buffered optical fiber as claimed in claim 1 wherein the material of said first layer is a curable acrylate;

the material of said second layer is a UV curable acrylate; and the material of said third layer is a UV curable acrylate.

6. A method of fabricating a buffered optical fiber comprising:

advancing an optical fiber having first and second coating layers thereon through a vertically oriented coating head;

placing a third layer of a UV curable material on the second layer;

advancing the fiber havin the third layer thereon through a vertically oriented UV oven and curing the material of the third layer;

advancing the optical fiber through a horizontal processing system using a transition sheave; and coating the third layer with a fourth buffering layer of a thermoplastic material having a modulus greater than the modulus of the material of the third layer, and cooling the fourth layer.

7. The method of fabricating a buffered optical fiber as claimed in claim 6 wherein said fourth layer is selected from one or more of the groups including polyamides, polypropylenes, polyesters or fluoropolymers.

8. The method of fabricating a buffered optical fiber as claimed in claim 6 and further including the step of hardening the fourth layer.

9. The method of fabricating a buffered optical fiber as claimed in claim 6 wherein the material of the third layer is one of a UV curable silicon acrylate material or a UV curable siloxane urethan acrylate material.

10. The method of fabricating a buffered optical fiber as claimed in claim 6 wherein the fourth layer has a thickness of $200\mu$ to $350\mu$.

* * * * *